(12) United States Patent
Kretsch et al.

(10) Patent No.: US 10,951,247 B1
(45) Date of Patent: Mar. 16, 2021

(54) CHANNELIZING A WIDEBAND WAVEFORM FOR TRANSMISSION ON A SPECTRAL BAND COMPRISING UNAVAILABLE CHANNEL SEGMENTS

(71) Applicant: Viasat, Inc., Carlsbad, CA (US)

(72) Inventors: Michael T. Kretsch, San Diego, CA (US); David C. Jacobs, Solana Beach, CA (US); David J. Trusheim, Poway, CA (US); Robert T. Short, Vista, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 16/598,201

(22) Filed: Oct. 10, 2019

(51) Int. Cl.
| | |
|---|---|
| *H04B 1/18* | (2006.01) |
| *H04B 1/00* | (2006.01) |
| *H04L 27/26* | (2006.01) |
| *H04B 1/04* | (2006.01) |

(52) U.S. Cl.
CPC ............ *H04B 1/0075* (2013.01); *H04B 1/04* (2013.01); *H04L 27/2631* (2013.01); *H04B 2001/0491* (2013.01)

(58) Field of Classification Search
CPC .............................. H04B 1/0075; H04B 1/04; H04B 2001/0491; H04L 27/2631
USPC ...................................................... 455/189.1
See application file for complete search history.

(56) References Cited

U.S. PATENT DOCUMENTS

| | | | |
|---|---|---|---|
| 4,112,430 A | 9/1978 | Ladstatter | |
| 5,838,732 A * | 11/1998 | Carney | ............... H04L 27/2602 375/297 |
| 6,560,463 B1 * | 5/2003 | Santhoff | ............... H04W 52/20 455/522 |
| 6,898,235 B1 | 5/2005 | Carlin et al. | |

(Continued)

FOREIGN PATENT DOCUMENTS

| | | |
|---|---|---|
| CA | 2537395 A1 | 8/2006 |
| CN | 106685476 B | 2/2019 |

OTHER PUBLICATIONS

Sklivanitis et al., "All-Spectrum Cognitive Channelization around Narrowband and Wideband Primary Stations", IEEE, 2015, 8 pgs.
(Continued)

*Primary Examiner* — Sonny Trinh

(57) ABSTRACT

Methods, systems, and devices for channelizing a wideband waveform for transmission on a spectral band comprising unavailable channel segments are described. Generally, the described techniques provide for transmitting and receiving wideband waveforms when channels of a system bandwidth are unavailable for transmission. A transmitter may separate a first wideband signal into segments, with each segment a bandwidth corresponding to a channel of the system bandwidth, and may map the segments to the available channels. The transmitter may combine the mapped segments into a second wideband waveform and transmit the second wideband waveform using the available channels. A receiver may receive a first wideband signal waveform and may separate the first wideband signal waveform into segments, de-map (Continued)

the segments and combine the de-mapped segments into a second wideband waveform for demodulation. The techniques may be used to transmit and receive wideband waveforms over tactical data links.

49 Claims, 9 Drawing Sheets

(56) References Cited

U.S. PATENT DOCUMENTS

| | | | |
|---|---|---|---|
| 6,937,674 | B2 | 8/2005 | Santhoff et al. |
| 7,430,257 | B1 * | 9/2008 | Shattil ............... H04B 1/707 342/367 |
| 7,965,761 | B2 * | 6/2011 | Shattil ............. H04L 27/2697 375/147 |
| 8,107,887 | B2 | 1/2012 | Rao et al. |
| 8,155,649 | B2 | 4/2012 | McHenry et al. |
| 9,094,109 | B2 | 7/2015 | Revol |
| 9,209,891 | B1 | 12/2015 | Mandell et al. |
| 9,385,798 | B1 | 7/2016 | Marr et al. |
| 9,722,660 | B1 | 8/2017 | McCloskey et al. |
| 2005/0190777 | A1 | 9/2005 | Hess et al. |
| 2006/0013327 | A1 | 1/2006 | Sugar et al. |
| 2007/0135052 | A1 | 6/2007 | Park et al. |
| 2009/0067513 | A1 | 3/2009 | Kim et al. |
| 2012/0113831 | A1 * | 5/2012 | Pelletier ............ H04L 5/0053 370/252 |
| 2012/0170672 | A1 | 7/2012 | Sondur |
| 2016/0137311 | A1 | 5/2016 | Peverill et al. |
| 2016/0182266 | A1 | 6/2016 | Gaal |
| 2017/0318497 | A1 | 11/2017 | Tranquilli, Jr. |
| 2018/0287682 | A1 | 10/2018 | Kwak |
| 2019/0097678 | A1 | 3/2019 | Park et al. |
| 2019/0190595 | A1 | 6/2019 | Ching |
| 2019/0207731 | A1 | 7/2019 | Park |
| 2019/0312766 | A1 | 10/2019 | Sengupta |
| 2019/0334587 | A1 | 10/2019 | Rahman et al. |
| 2019/0379437 | A1 | 12/2019 | Park et al. |
| 2020/0022168 | A1 | 1/2020 | Xu |
| 2020/0052947 | A1 | 2/2020 | Sahin et al. |

OTHER PUBLICATIONS

Harris et al., "Digital Receivers and Transmitters Using Polyphase Filter Banks for Wireless Communications" IEEE, Published Apr. 8, 2003, 40 pgs.

Harris et al., Orthogonal Waveforms and Filter Banks for Future Communication Systems, Chapter 6—"Filter banks for Software Defined Radio", https://www.sciencedirect.com/science/article/pii/B9780128103845000062; Published by Academic Press 2017, pp. 105-127.

U.S. Appl. No. 16/598,261, entitled "Channelizing and Beamforming a Wideband Waveform" (filed Oct. 10, 2019) (assigned to Viasat, Inc.).

International Search Report and Written Opinion issued in International Application No. PCT/US2020/054644, dated Dec. 16, 2020 in 20 pages.

International Search Report and Written Opinion issued in International Application No. PCT/US2020/054639, dated Jan. 29, 2021 in 11 pages.

Northrop Grumman, "Understanding voice and data link networking understanding voice and data link letworking. Northrop Grumman's guide to secure tactical data links," Dec. 1, 2014, XP055559331, Retrieved from the Internet: http://www.northropgrumman.com/capabilities/datalinkprocessingandmanagement/documents/understanding_voice+data_link_networking.pdf.

* cited by examiner

CHANNELIZING A WIDEBAND WAVEFORM FOR TRANSMISSION ON A SPECTRAL BAND COMPRISING UNAVAILABLE CHANNEL SEGMENTS

BACKGROUND

The following relates generally to wideband communications, and more specifically to channelizing a wideband waveform for transmission on a spectral band comprising unavailable channel segments.

Wired and wireless communications systems are widely deployed to provide various types of communication content such as voice, video, packet data, messaging, broadcast, and so on. Some communications systems may be used in the context of secure communications, such as tactical communications. In addition, some communication systems may experience frequency-dependent interference. Such communications systems may be subject to various constraints and challenges.

SUMMARY

The described techniques relate to improved methods, systems, devices, and apparatuses that support channelizing a wideband waveform for transmission on a spectral band comprising unavailable channel segments. Generally, the described techniques provide for transmitting and receiving wideband waveforms when channels of a system bandwidth are unavailable for transmission. The described techniques may include techniques for transmitting a wideband waveform via a spectral band comprising unavailable channel segments. The techniques may include identifying a subset of a plurality of channels of a system bandwidth available for a transmission in a time period, generating a first wideband waveform having a bandwidth determined according to a number of channels in the subset of the plurality of channels, separating the first wideband waveform into a plurality of segments, mapping the plurality of segments to the subset of the plurality of channels of the system bandwidth, combining the mapped plurality of segments to generate a second wideband waveform, and transmitting the second wideband waveform in the time period.

The described techniques may include techniques for receiving a wideband waveform via a spectral band comprising unavailable channel segments. The techniques may include identifying a subset of a plurality of channels of a system bandwidth available for a transmission in a time period, receiving a first wideband waveform in the time period, separating the first wideband waveform into a plurality of waveform segments corresponding to the subset of the plurality of channels, de-mapping the plurality of waveform segments based at least in part on the subset of the plurality of channels, combining the de-mapped plurality of waveform segments to obtain a second wideband waveform, and demodulating the second wideband waveform to obtain a stream of bits.

DETAILED DESCRIPTION

Figure 1:
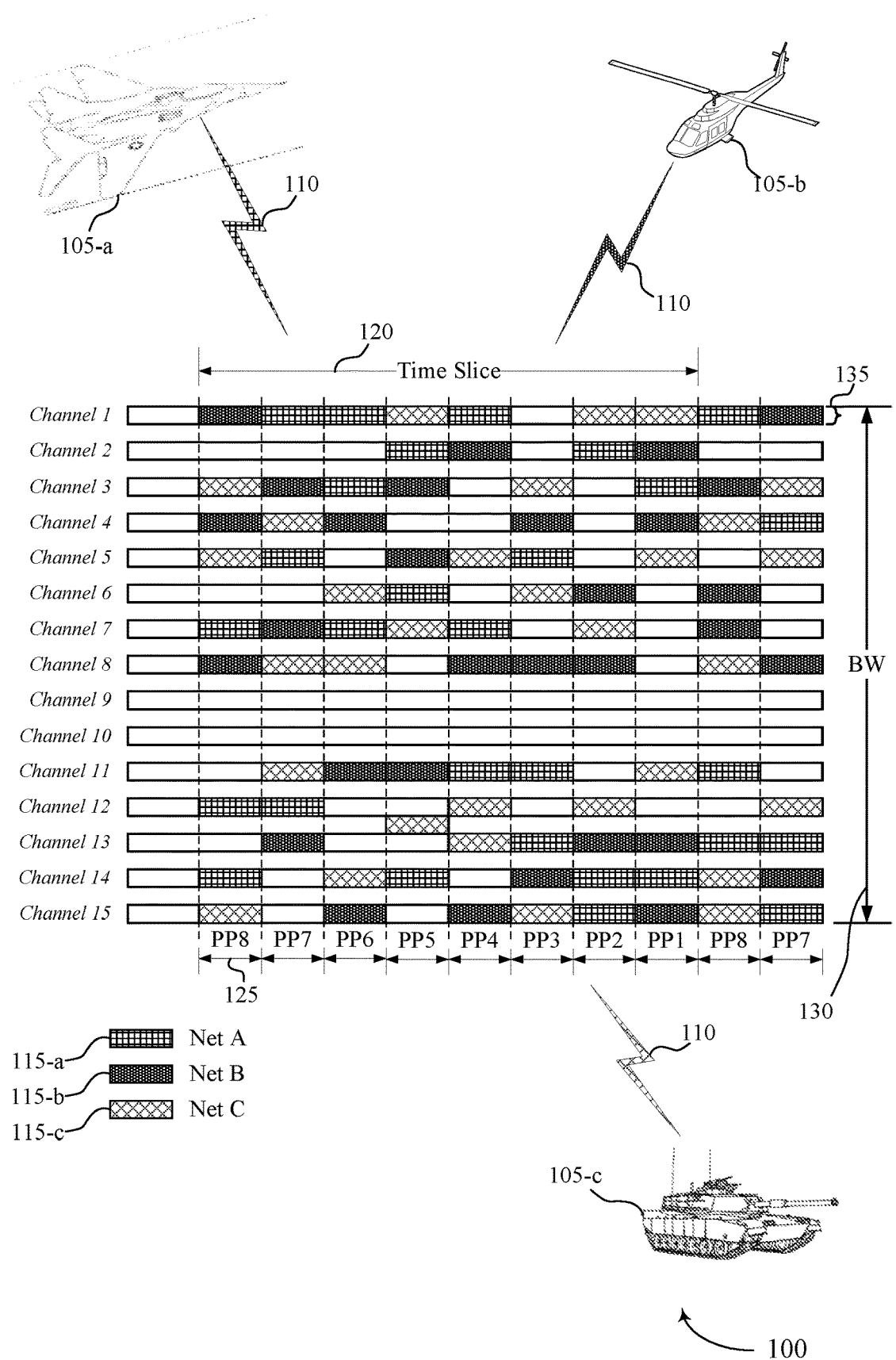
FIG. 1 illustrates an example of a wireless communication system that supports channelizing a wideband waveform for transmission on a spectral band comprising unavailable channel segments in accordance with aspects of the present disclosure.

Wireless communications systems used for secure communications, such as for tactical communications between military entities, may be subject to various constraints and challenges. For example, such communications may be expected to provide a high level of robustness to external tampering, a high level of reliability, etc. The Link 16 communication protocol is an example of a tactical data link that may provide various advantages for tactical communications, such as providing a relatively high level of security for transmissions. Link 16 was originally developed for tactical airborne air-to-air communications and supports voice communications and limited data communications. The spectrum used by Link 16 has been highly regulated, and the protocol was designed to support sparse waveforms that use relatively little spectrum. Tactical data links such as Link 16 may operate as primary user (e.g., prioritized over other users), a secondary user (e.g., a lower priority user than at least one other user), or as a tertiary user (e.g., as a user that obtains permission to use spectrum for transmission).

In recent years the use of Link 16 has expanded and the risks of jamming and other undesirable interference have increased. Because tactical data links such as Link 16 operate on older physical layers and under relatively tight regulation, however, increasing the capacity (e.g., throughput), spectrum efficiency, and security—particularly while maintaining backward compatibility—may be challenging.

Traditional data links may use single-channel transmission. In this case, if a particular transmission channel is jammed or otherwise unavailable for transmission, the transmitter may select a different channel if available. However, in single-channel transmissions, the transmission energy may be concentrated within the channel and may be more easily detectible or jammable.

As described herein, a transmitter may provide better anti jamming performance, better throughput, and/or better spectrum efficiency by generating a wideband waveform representing the data to be transmitted and mapping the wideband waveform to multiple available channels. In this case, the information may be spread across multiple channels to reduce detectability of the signal, improve transmission quality and throughput, and mitigate the effect of channel jamming.

For example, in some cases, a transmitter used in a system for transmitting wideband waveforms over a tactical data link may receive a stream of bits for transmission (e.g., from a processor in the system), and may generate a wideband waveform based on the stream of bits. In some cases, the system may be configured to transmit wideband waveforms using a system bandwidth that may include or may be partitioned into multiple channels, where each channel may have a predetermined (e.g., the same) channel bandwidth. In some cases, not all of the channels of the system bandwidth may be available for transmission, such as if one or more of the channels are used for other communications or jammed by a malicious entity.

The transmitter may identify a subset of the channels that are available for transmission (e.g., channels that are unused or unjammed, as determined based on the signal power of the channels). The transmitter may separate the first wideband signal into segments, with each segment having the channel bandwidth, and may map the segments to the available channels. The transmitter may combine the mapped segments into a second wideband waveform and transmit the second wideband waveform using the available channels. In this manner, the transmitter may use all of the available channels together and spread the energy across them—that is, the energy of each bit of data may be spread across multiple channels. In this case, jamming a channel may have limited effect on the quality of the transmission, since it may only affect a small part of the energy of transmission associated with the data.

Although the discussion herein focuses on wireless communications using, for example, tactical data links, such techniques may also be used for other wireless or wireline communications. For example, various wireless or wireline communication environments may experience spectral holes that are not available for transmission (e.g., due to impedance mismatching or due to interference). One such example may be digital subscriber line (DSL) communications, however other examples will be apparent to one of skill in the art. Moreover, such techniques may be applied to other types of signals that are transmitted and received, such as radar signals and sonar signals, and may be used in applications such as in hearing aids.

Aspects of the disclosure are initially described in the context of a wireless communications system. Aspects of the disclosure are further illustrated by and described with reference to apparatus diagrams, system diagrams, and flowcharts that relate to channelizing a wideband waveform for transmission on a spectral band comprising unavailable channel segments.

FIG. 1 illustrates an example of a communication system 100 that may employ channelizing a wideband waveform for transmission on a spectral band comprising unavailable channel segments, according to various aspects of the disclosure. Communication system 100 includes devices 105 that may be capable of wireless communication using a tactical data link 110. Devices 105 may be a handheld device carried by a user, or may be located in a vehicle such as aircraft, tank, ship, or other type of vehicle. Tactical data link 110 may support secure communications between devices 105 and may include frequency hopping capabilities. Frequency hopping may refer to rapidly switching a carrier among different frequency channels using a sequence (e.g., a pseudorandom sequence) known to both transmitter and receiver. For example, tactical data link 110 may support frequency hopping at 13 microsecond intervals or at other relatively short intervals.

Tactical data link 110 may enable devices 105 to communicate on a system bandwidth that includes multiple channels having predetermined bandwidths (e.g., each channel having the same bandwidth). In some cases, not all of the channels may be available for transmission. For example, in some cases tactical data link 110 may transmit on a data link network platform having a spectral band (e.g., a system bandwidth) comprising N bandwidth segments (e.g., channels) only M of which may be available at any given time. In some cases, a tactical data link 110 may have a spectral band of 240 MHz (e.g., a band that ranges from 967.5 to 1207.5 MHz), where N is 80 channels each comprising 3 MHz and M is 51 or less.

In some cases, tactical data link 110 may be a time division multiple access (TDMA) platform in which each user is assigned one or more time slices in which to transmit. A transmitting user may transmit a message as a sequence of encoded pulses, which are frequency-hopped in a unique hopping pattern among the channels within a time slice. In some cases, each pulse may have a bandwidth equal to a channel bandwidth, and may be mapped to one of the channels according to the hopping pattern. In some cases, the hopping pattern is known to the receiving user. Use of hopping patterns may allow multiple users to transmit in the same time slice. In some cases, each user transmitting in the same time slice but using a different hopping pattern may be referred to as transmitting on a different "net." In some cases, transmissions may include parallel pulses on each available channel. However, if one or more channels on which the pulses are mapped is jammed or has substantial interference, the link performance may degrade substantially.

According to various aspects of the disclosure, a transmitter may enhance performance over a segmented spectral band by generating a wideband waveform representing the data to be transmitted and mapping the wideband waveform to multiple available channels. Channelizing the wideband waveform may provide better anti jamming performance, better throughput, and/or better spectrum efficiency. For example, the information may be spread across multiple channels to reduce detectability of the signal, improve transmission quality and throughput, and mitigate the effect of channel jamming.

A transmitter used in a system for transmitting wideband waveforms over a tactical data link may receive a stream of bits for transmission (e.g., from a processor in the system), and may generate a wideband waveform based on the stream of bits. In some cases, the system may be configured to transmit wideband waveforms using a system bandwidth that may include or may be partitioned into multiple channels, where each channel may have a predetermined (e.g., the same) channel bandwidth. In some cases, not all of the channels of the system bandwidth may be available for transmission, such as if one or more of the channels are used for other communications or jammed by a malicious entity.

The transmitter may identify a subset of the channels that are available for transmission (e.g., channels that are unused or unjammed, as determined based on the signal power of the channels). The transmitter may separate the first wideband signal into segments, with each segment having the channel bandwidth, and may map the segments to the available channels. The transmitter may combine the mapped segments into a second wideband waveform and transmit the second wideband waveform using the available channels. In this manner, the transmitter may use all of the available channels together and spread the energy across them—that is, the energy of each bit of data may be spread across multiple channels. In this case, jamming a channel may have limited effect on the quality of the transmission, since it may only affect a small part of the energy of transmission associated with the data.

FIG. 1 illustrates a system bandwidth 130 including 15 channels with three devices 105 transmitting over three different nets 115 of tactical data link 110 during a time slice 120. For example, a first device 105-a may transmit over net A 115-a, a second device 105-b may transmit over net B 115-b, and a third device 105-c may transmit over net C 115-c. Each of the devices may concurrently receive or listen to one or more nets 115. For example, device 105-a may transmit over net 115-a while receiving net B 115-b and net C 115-c. Alternatively, some devices 105 may only transmit or receive during a given time slice 120. First device 105-a may transmit using three channels 135 during each pulse period 125 in time slice 120, where the channels 135 used by first device 105-a for each pulse period 125 of time slice 120 may be determined by the hopping pattern associated with net A 115-a. For each time slice 120, device 105-a may determine an available subset of the system bandwidth 130. For example, device 105-a may determine a number of channels that are configured for net A 115-a for time slice 120. Additionally or alternatively, device 105-a may determine a subset of channels 135 available for the time slice 120, which may be based on a configuration for the system bandwidth (e.g., for one or more time slices 120). In addition, one or more channels 135 may be unavailable due to interference (e.g., jamming). For example, device 115-a may be configured to use three channels 135 per pulse period 125 of time slice 120, and may determine that 13 of the 15 channels of the system bandwidth are available for time slice 120. In addition, device 105-a may determine that one or more channels 135 have an interference level that meets or exceeds a threshold. In one example, device 105-a may determine that channels 7 and 8 have excessive interference during time slice 120. Device 105-a may be mapped to different subsets (e.g., provisional subsets) of three channels 135 per pulse period 125. For each pulse period 125 where net A 115-a is mapped to one or more of channels 7 and 8, device 105-a may allocate transmission power to the other channels associated with the pulse period 125. For example, for pulse periods 8, 6, and 4 of time slice 120, device 105-a may allocate its transmission power between the other two channels 135 (e.g., allocating zero power to channels 7 and 8), while in the other pulse periods device 105-a may allocate its transmission power between three channels 135. In some cases, devices 105 may make a determination of available channels on a pulse period 125 basis. For example, device 105-a may receive or identify an indication of a provisional subset of channels for a given pulse period 125, and may make a determination of the available channels of the provisional subset of channels (e.g., based on interference).

Although illustrated as having 15 total channels, tactical data link 110 may have any number of channels, and an arbitrary number up to and including all of the total number of channels may be available for each time slice 120. Each net 115 may also be associated with varying numbers of channels for each pulse period, up to and including the number of available channels. Although nets A, B, and C are illustrated in FIG. 1 as having non-overlapping hopping patterns, hopping patterns for nets 115 may overlap during one or more pulse periods 125 of a time slice 120, in some cases. Although FIG. 1 depicts three pulses (e.g., on three channels 135) on each net 115 per pulse period 125, in some cases, tactical data link 110 may support a different number of pulses on each net 115, such as one pulse per net 115 per pulse period 125.

Figure 2:
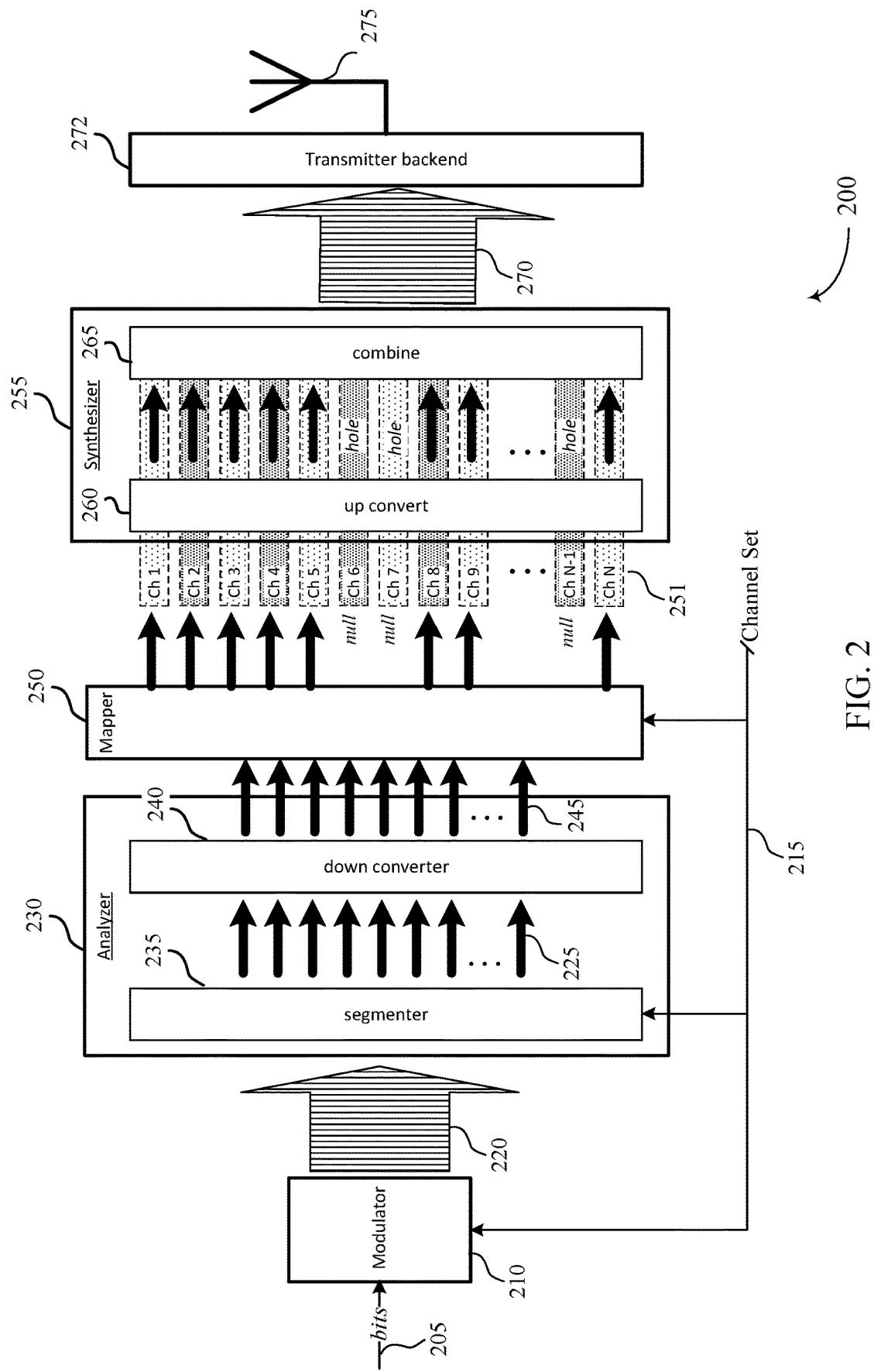
FIG. 2 illustrates an example of a transmitter that supports channelizing a wideband waveform for transmission on a spectral band comprising unavailable channel segments in accordance with aspects of the present disclosure.

FIG. 2 illustrates an example of a transmitter 200 that supports channelizing a wideband waveform for transmission on a spectral band comprising unavailable channel segments in accordance with aspects of the present disclosure. In some examples, transmitter 200 may be included in a wireless communication system, such as wireless communication system 100.

Transmitter 200 may be configured to wirelessly transmit wideband waveforms over a tactical data link using one or more antennas 275 and a transmitter backend 272. In some cases, a wideband waveform may be a waveform that spans a relatively wide band of frequencies, and may be a spread spectrum waveform Transmitter 200 may be configured to transmit wideband waveforms using a system bandwidth, which may be a band of frequencies over which transmitter 200 may transmit signals. In some cases, a system bandwidth may be partitioned into channels, with each channel having a respective bandwidth (e.g., the same channel bandwidth). In some cases, one or more channels of the system bandwidth may be unavailable for transmissions if, for example, the channels are excluded from a subset of configured available channels or are jammed by interfering signals (e.g., other transmissions or intentional jamming). In some cases, transmitter 200 may identify a channel set 215 (e.g., a set of channels selected for transmission) and may transmit wideband waveforms using the channel set 215, as described in more detail herein. In some examples, the channel set 215 may correspond to all of the available channels, while in some cases channel set 215 may be a subset of the available channels (e.g., a configured number of channels). In some cases channel set 215 may be determined by excluding channels from the available channels or configured channels that have a level of signal power (e.g., interference) that satisfies (e.g., meets or exceeds) a threshold.

In operation, transmitter 200 may receive a stream of bits 205, such as data bits for transmission. In some cases, the stream of bits 205 may be received for transmission in a time period (e.g., a pulse period). In some cases, transmitter 200 may receive the stream of bits 205 from a processor or other device that is coupled with transmitter 200. Transmitter 200 may include a modulator 210 for modulating the stream of bits 205 to generate a first wideband waveform 220. In some cases, modulator 210 may receive an indication of channel set 215, and may modulate the stream of bits 205 based on the number of channels in channel set 215. For example, a device that includes transmitter 200 may identify a total number of channels of a system bandwidth and a set of available channels for a time slice or pulse period (e.g., configured for the time slice or pulse period, or having a signal power level that does not satisfy a threshold). The device may determine channel set 215 from the set of available channels (e.g., a subset or all of the set of available channels).

In some cases, channel set 215 may exclude channels that have signal power satisfying the threshold (e.g., due to excessive use or intentional jamming). In some cases, the channel set 215 may be non-contiguous; that is, at least two channels in the channel set 215 may be separated by one or more channels that are excluded from the channel set 215.

In some cases, the modulator 210 may modulate the stream of bits 205 to generate a first wideband waveform 220 having a bandwidth that is equal to an aggregate bandwidth of the channels in the channel set 215. For example, where the bandwidth of the channels are the same, the bandwidth of first wideband waveform 220 may be determined by the number of channels in channel set 215 multiplied by the channel bandwidth. In one example, transmitter 200 may be configured to transmit via M segments, each segment having a bandwidth of B MHz. Thus, the bandwidth of the first wideband waveform may be equal to M·B MHz. Where the bandwidths of the channels are not the same, the bandwidth of first wideband waveform 220 may be determined by summing the bandwidths of the channels in channel set 215.

In some cases, modulator 210 may be a variable modulator that may select a modulation scheme (e.g., from a set of modulation schemes) for modulating the stream of bits 205 based on various factors. For example, modulator 210 may select a modulation scheme based on the channel set 215 and/or on a desired coding rate, block error rate (BLER), or throughput. In some cases, the modulation scheme may specify, for example, a modulation type (e.g. BPSK, QPSK, 16 QAM, etc.), a type of code (e.g., convolutional code, LDPC code), and a code rate (e.g., a rate 1/3 code, a rate 5/8 code).

Transmitter 200 includes analyzer 230. Analyzer 230 includes segmenter 235 for separating the first wideband waveform 220 into multiple segments 225. Segments 225 may have respective bandwidths corresponding to channel bandwidths of the channel set 215 (e.g., the same bandwidth). In some cases, segmenter 235 may separate the first wideband waveform 220 into segments 225 by applying multiple filters (such as bandpass filters (BPFs)) to the first wideband waveform 220. In some cases, segmenter 235 may include a series of filters to separate first wideband waveform 220 into segments 225, and may be implemented using a polyphase filter. Each segment 225 may have an effective symbol timing that is less (e.g., substantially less) than the symbol timing (e.g., pulse period). That is, each segment 225 may carry information associated with multiple symbols in each symbol period or pulse period.

In some cases, analyzer 230 includes downconverter 240 to downconvert the segments 225 to baseband segments 245 For example, segments 225 may each be associated with different frequency ranges and downconverter 240 may downconvert each segment to a baseband frequency range.

Transmitter 200 includes mapper 250 for mapping the segments (e.g., baseband segments 245) to the corresponding frequency ranges of channel set 215. In some cases, the remaining channels (e.g., channels of the system bandwidth that are not in channel set 215) may be set to null values. For example, mapper 250 may output a null segment or null signal for channels of the system bandwidth that are not in channel set 215. A null segment may be a signal having no signal energy within the baseband frequency range.

Mapper 250 may map segments 225 to channel set 215 in an order of the segments 225. Alternatively, mapper 250 may scramble an order of the segments 225 among channel set 215 such that the segments 225 are mapped to channel set 215 out of order relative to the order of the segments, as depicted in FIG. 2. For example, adjacent segments may not be mapped to adjacent channels of channel set 215. Where a scrambled order is used, mapping of non-adjacent segments to adjacent channels of channel set 215 may cause aliasing of signal energy from adjacent segments at the receiver. Thus, groups of segments may be mapped to contiguous blocks of channels of channel set 215. That is, groups of contiguous blocks of channel set 215 may be identified, and sub-groups of contiguous segments 225 may be mapped to each of the groups of contiguous blocks. Mapper 250 may output mapped segments 251 to synthesizer 255.

In some examples, mapper 250 may perform additional processing. For example, mapper 250 may perform multipath equalization of segments 225 or mapped segments 251 before outputting mapped segments 251.

Transmitter 200 includes synthesizer 255 for generating a second wideband waveform 270. Synthesizer 255 includes upconverter 260 for upconverting the mapped segments to higher frequencies. Synthesizer 255 includes combiner 265 for combining the upconverted segments and holes in the spectrum (corresponding to the null values) into a second wideband waveform 270 having a bandwidth corresponding to the channel set 215 (e.g., extending from a first channel of channel set 215 having a lowest frequency to a second channel of channel set 215 having a highest frequency). Second wideband waveform 270 may have a bandwidth that is wider than first wideband waveform 220. Second wideband waveform may include null frequency ranges (e.g., corresponding to frequency channels of the system bandwidth that are not in channel set 215).

In some cases, by generating the second wideband waveform 270 as described herein, the energy of each bit of the stream of bits 205 may be spread over the channels in second wideband waveform 270 and may therefore be less susceptible to data loss due to jamming of a single channel.

In some cases, transmitter 200 may include a transmitter backend 272 that includes hardware or software to implement additional processing on second wideband waveform 270 before transmission using one or more antennas 275. For example, the second wideband waveform 270 may be upconverted to passband before transmission.

In some cases, the transmitted signal (e.g., the transmitted second wideband waveform) will carry the information in the first wideband waveform that is output by the modulator, but there may be substantial energy only in the channels of channel set 215. In this case, the transmitted signal may not interfere with signals transmitted (e.g., by other transmitters) in the other channels of the system bandwidth.

In one example, a system bandwidth of 45 MHz may be configured with 3 MHz channels (e.g., 15 channels). Transmitter 200 may identify a channel set 215 for a first time period (e.g., a first pulse period) that includes channels 1-5, 8-10, 13, and 15 (e.g., including 10 of the 15 channels). Modulator 210 may generate a first wideband waveform 220 having a bandwidth of 30 MHz and analyzer 230 may segment and downconvert each segment to generate 10 baseband segments 245, each representing a portion (e.g., 3 MHz) of the 30 MHz bandwidth, and each having a baseband frequency range of 0-3 MHz. Mapper 250 may map the baseband segments 245 to the channel set 215, and may map null waveforms to channels of the system bandwidth not in channel set 215. Mapper 250 may map the baseband segments 245 to channel set 215 in order, or mapper 250 may map the baseband segments 245 to channel set 215 in a scrambled order. For example, mapper 250 may map baseband segment 1 to channel 13, baseband segments 2-4 to channels 8-10, baseband segments 5-9 to channels 1-5, and baseband segment 10 to channel 15. Synthesizer 255 may upconvert the mapped segments 251 to corresponding frequencies of channel set 215 and combine the upconverted segments to obtain a second wideband waveform 270. In this example, second wideband waveform 270 may have a bandwidth of 45 MHz, with substantially no signal energy in channels 6, 7, 11, 12, and 14. In instances where channel set 215 does not include channel 1 or channel 15, second wideband waveform 270 may have a bandwidth of less than the system bandwidth of 45 MHz (e.g., where one or more segments are not mapped to the upper or lower channels of the system bandwidth).

Transmitter 200 may identify a new channel set 215 for a second time period (e.g., a second pulse period), and may perform the segmenting, downconverting, mapping, upconverting, and combining to generate a second wideband waveform 270 for the second time period. For example, transmitter 200 may identify a new channel set 215 every pulse period, or every fourth, eighth, or twelfth pulse period, or every time slice, or at some other time period. New channel set 215 may be different than the channel set 215 for the first pulse period and may or may not have any channels in common with the previous channel set 215. For example, new channel set 215 may have the same or a different number of channels. It should be understood that this example is provided for the sake of clarity, and other system bandwidths and channel bandwidths are contemplated without deviating from the scope of the application. For example, the system bandwidth may be 240 MHz, and the system may have 80 channels where each channel has a 3 MHz channel bandwidth. Channel set 215 may have up to 51 channels in each pulse period and thus first wideband waveform 220 may have a bandwidth of up to 153 MHz while second wideband waveform 270 may have a bandwidth of up to 240 MHz (e.g., the system bandwidth).

Figure 3:
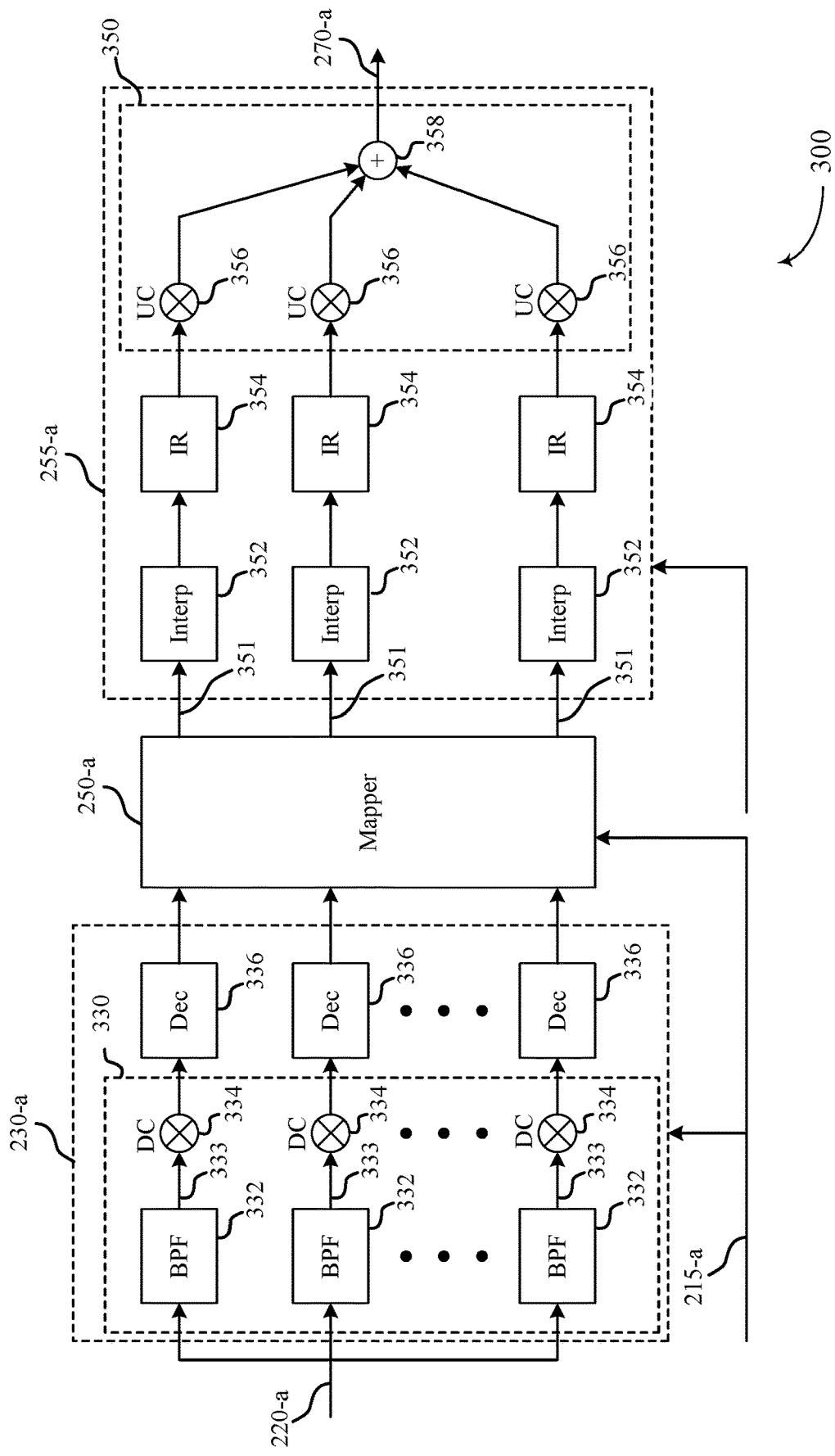
FIG. 3 illustrates an example of a transmitter that supports channelizing a wideband waveform for transmission on a spectral band comprising unavailable channel segments in accordance with aspects of the present disclosure.

FIG. 3 illustrates an example of a portion of a transmitter 300 that supports channelizing a wideband waveform for transmission on a spectral band comprising unavailable channel segments in accordance with aspects of the present disclosure. In some examples, transmitter 300 may implement aspects of wireless communication system 100 or transmitter 200.

Transmitter 300 includes analyzer 230-a, mapper 250-a, and synthesizer 255-a, which may be examples of analyzer 230, mapper 250, and synthesizer 255 of FIG. 2, respectively. A first wideband waveform 220-a may be input to analyzer 230-a. Analyzer 230-a includes multiple bandpass filters 332, downconverters (DCs) 334, and decimators 336. Band-pass filters 332 may each be associated with a frequency range of the first wideband waveform 220-a. For example, the first wideband waveform 220-a may have a bandwidth corresponding to an aggregate bandwidth of a number of segments in a channel set 215-a configured for transmission within a pulse period. In one example, transmitter 300 may be configured to transmit via M segments, each segment having a bandwidth of B MHz. In this case, analyzer 230-a may have M (or more) bandpass filters 332, each configured to pass a range of frequencies corresponding to the bandwidth of one segment. That is, bandpass filters 332 may be configured to pass frequencies in ranges of $\{0$ to $B\}$, $\{B$ to $2B\}$, ... $\{(M-1)*B$ to $M*B\}$. Bandpass filters 332 may output filtered segment waveforms 333.

Downconverters 234 may downconvert filtered segment waveforms 333 to a baseband frequency range. For example, downconverters 234 may downconvert each filtered segment waveform 333 to have a frequency range of $\{0$ to $B\}$. Decimators 336 may decimate (e.g., downsample) the downconverted filtered segment waveforms 333 from a first sample rate associated with the first wideband waveform 220-a to a second, lower sample rate (e.g., which may not cause aliasing because of the smaller bandwidth of each segment). In some cases, bandpass filters 332 and downconverters 334 may be implemented in a downconverting filter 330. Downconverting filter 330 may implement bandpass filters 332 using a polyphase filter and an inverse discrete Fourier transform (IDFT). In some cases, both the inputs and the outputs of the inverse DFT are in the time domain. It should be understood that the IDFT may be implemented using an inverse fast Fourier transform (IFFT) algorithm, and the terms IDFT and IFFT may be used interchangeably.

Mapper 250-a may map the downconverted filtered segment waveforms 333 to segments of a channel set (e.g., channel set 215-a). Mapper 250-a may map downconverted filtered segment waveforms 333 to the segments in order of the downconverted filtered segment waveforms 333. Alternatively, mapper 250-a may map the downconverted filtered segment waveforms 333 to the segments of the channel set using a scrambled mapping (e.g., not in order). Mapper 250-a outputs mapped segment waveforms 351, each mapped segment waveform 351 being a baseband waveform sampled according to a baseband sampling frequency. Mapper 250-a may output M mapped segment waveforms 351, where M corresponds to a number of segments in channel set 215-a (e.g., null segments may not correspond to a mapped segment waveform 351).

Synthesizer 255-a includes interpolators 352, image rejection (IR) filters 354, upconverters 356, and combiner 358. Interpolators 352 effectively upsample the mapped segment waveforms 351 by interpolating from the second sample rate to a third, higher sample rate (e.g., a sample rate associated with a system bandwidth). For example, interpolators 352 may upsample the mapped segment waveforms 351 to a sample rate that is based on an aggregate bandwidth of a total number of channels of the system bandwidth (e.g., a sample rate that satisfies the Nyquist criteria for the system bandwidth).

Image rejection filters 354 may perform filtering to suppress image spectra that may result from interpolation.

Upconverters 356 upconvert each mapped segment waveform 351 to a frequency of the channel set 215-a. For example, a first upconverter 356 may upconvert a first mapped segment waveform 351 to a frequency of a first channel of the channel set 215-a, a second upconverter 356 may upconvert a second mapped segment waveform 351 to a frequency of a second channel of the channel set 215-a, and so on, such that each of the mapped segment waveforms 351 are upconverted to respective channels of the channel set 215-a. Combiner 358 combines the upconverted mapped segment waveforms 351 to obtain second wideband waveform 270-a, which may include signal energy in channels of a system bandwidth corresponding to channel set 215-a, and null waveforms (e.g., having substantially no signal energy) in channels of the system bandwidth not within channel set 215-a. Upconverters 356 and combiner 358 may be implemented as upconverting filter 350. In some cases upconverting filter 350 may implement upconverters 356 and combiner 358 using a polyphase filter and an inverse DFT.

Figure 4:
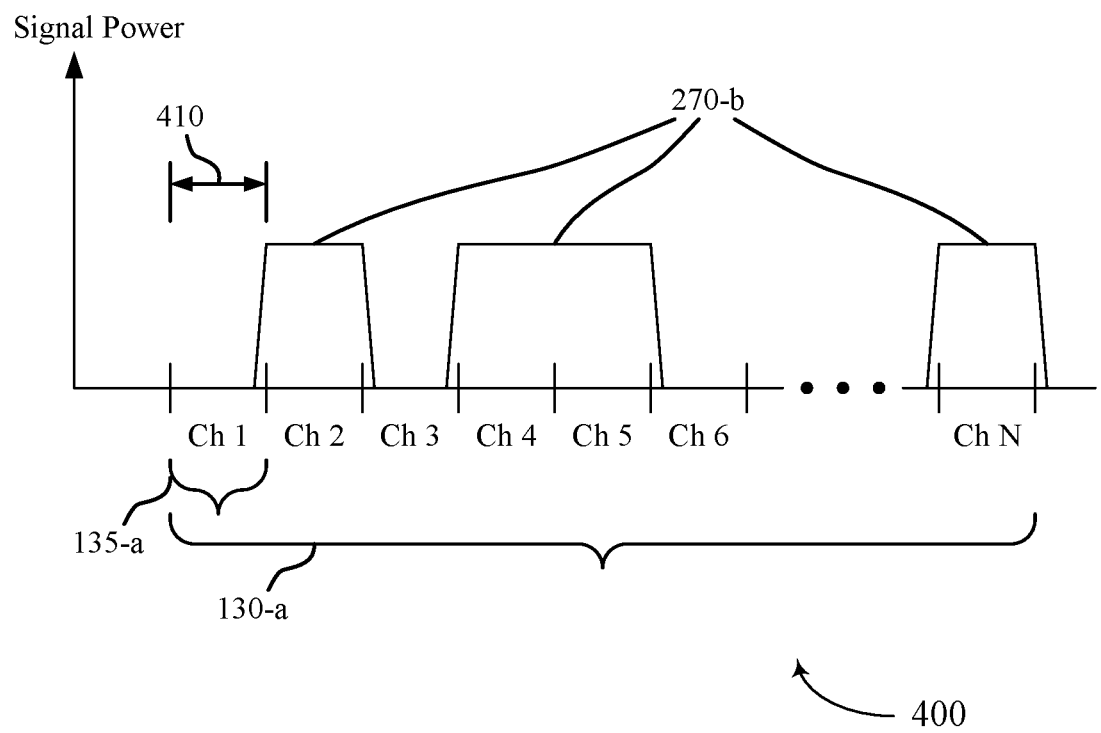
FIG. 4 illustrates an example of a spectrum plot that supports channelizing a wideband waveform for transmission on a spectral band comprising unavailable channel segments in accordance with aspects of the present disclosure.

FIG. 4 illustrates a spectrum plot 400 of a channelized wideband waveform for transmission on a spectral band comprising unavailable channel segments in accordance with aspects of the present disclosure. Spectrum plot 400 shows, for example, a system bandwidth 130-a that includes N channels 135-a. Each channel 135-a may have a channel bandwidth 410. Although FIG. 4 illustrates channels 135-a having the same channel bandwidth 410, channels 135-a may have different bandwidths, in some cases. In some examples, implementations using a polyphase synthesis bank or a polyphase analysis bank may be applied in environments where each channel 135 has the same channel bandwidth 135-*a*, or are multiples of a power of two.

Spectrum plot 400 illustrates spectrum of a second wideband waveform 270-*b*, which may be generated, for example, by the transmitters 200 or 300 of FIG. 2 or 3. Second wideband waveform 270-*b* may include signal power within channels 135-*a* of a channel set, while channels that are not included in the channel set may not have substantial signal power (e.g., may have null waveforms). For example, FIG. 4 illustrates that second wideband waveform 270-*b* has signal power in channels 2, 4, 5, and N (with some channels not shown for the sake of clarity), while channels 1, 3, and 6 have null signals (e.g., substantially no signal power). The bandwidth of the signal power of second wideband waveform 270-*b* for each channel 135-*a* may be understood as the range of the spectral density of the channel 135-*a* that includes signal power over a threshold (e.g., 3 dB, 6 dB). In some cases, the signal power waveform for each segment may have a guardband (e.g., a segment of 3 MHz may have guardbands of 100 KHz, or a 3 dB bandwidth of 2.8 MHz).

Figure 5A:
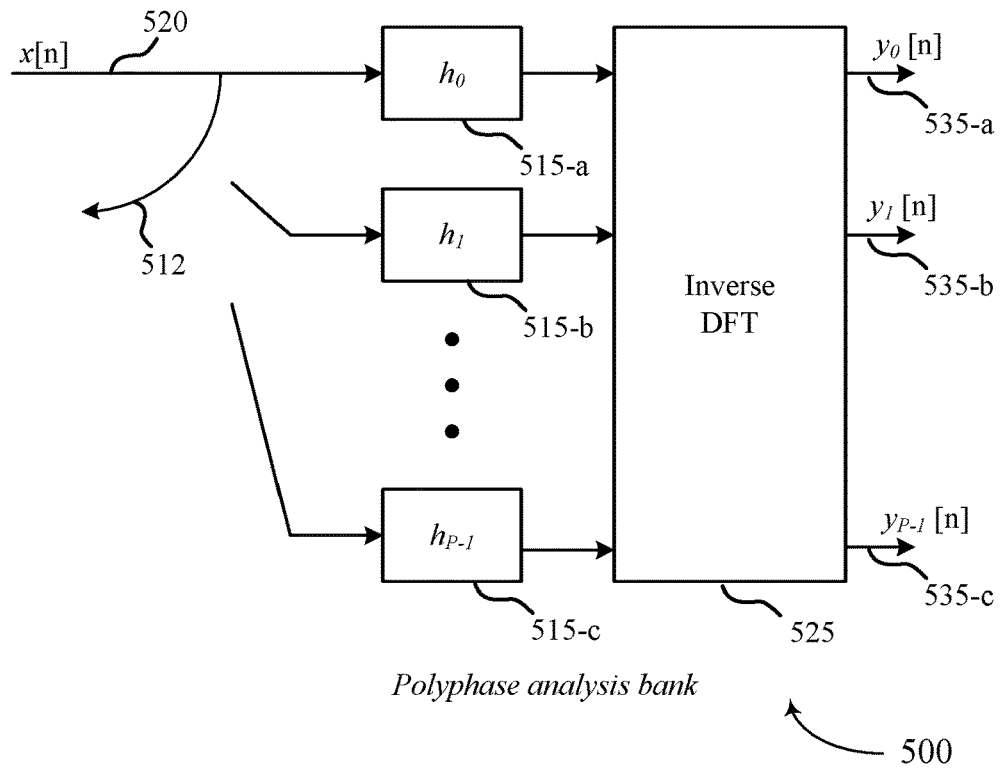
FIGS. 5A and 5B illustrate an example of a polyphase analysis bank and an example of a polyphase synthesis bank that support channelizing a wideband waveform for transmission on a spectral band comprising unavailable channel segments in accordance with aspects of the present disclosure.
Figure 5B:
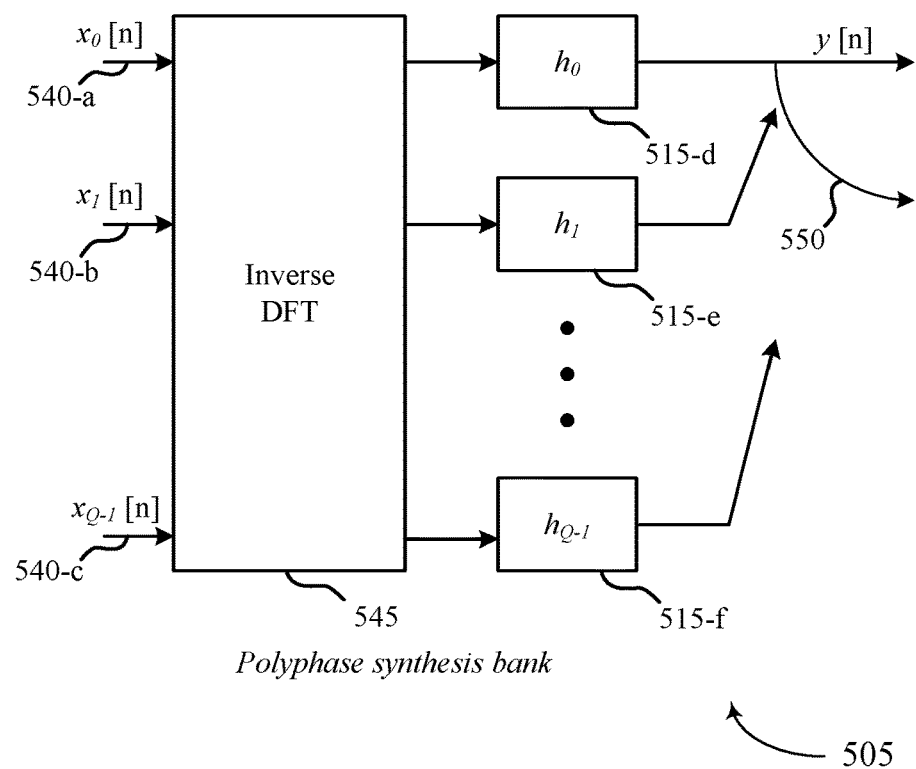

FIGS. 5A and 5B illustrate examples of polyphase analysis bank 500 and a polyphase synthesis bank 505 that support channelizing a wideband waveform for transmission on a spectral band comprising unavailable channel segments in accordance with aspects of the present disclosure. In some examples, polyphase analysis bank 500 and polyphase synthesis bank 505 may implement aspects of wireless communication system 100.

Polyphase analysis bank 500 includes multiple polyphase filters. For example polyphase analysis bank 500 is illustrated with P subfilters 515 and IDFT 525. Each subfilter 515 may have the same or different orders, and may be a bandpass filter. An input signal 520 (e.g., first wideband waveform 220) may be input to subfilters 515 (e.g., different sample interlaces may be input to subfilters 515 by commutator 512) and the output of the subfilters 515 may be input to inverse DFT 525. Each subfilter 515 may receive an interlaced subset of samples of the input signal 520. For example, subfilters 515-*a*, 515-*b*, and 515-*c* may each receive different subsets of samples of the input signal 520. In some cases, commutator 512, subfilters 515, and IDFT 525 may implement a downconversion polyphase filter that outputs downconverted filtered waveform segments 535. For example, commutator 512 may downsample the input signal 520, subfilters 512 may perform filtering, and IDFT 525 may perform downconversion. Polyphase analysis bank 500 may be an example of a downconverting filter 330.

Polyphase synthesis bank 505 may also include multiple polyphase filters. For example polyphase synthesis bank 505 is illustrated with IDFT 545 and Q subfilters 515. Each subfilter 515 (e.g., subfilters 515-*d*, 515-*e*, 515-*f* and others) may have the same or different orders. Inverse DFT 545 may receive Q input signals (e.g., mapped segments 251) and output Q signals to subfilters 515. IDFT 545 and subfilters 515 may perform filtering and upconversion to generate an upconverted waveform combining the signal energy within the Q signals (e.g., corresponding to Q segments). For example, the output of subfilters 515 may be combined by commutator 550 (e.g., by interlacing samples from the Q subfilters) to obtain the upconverted waveform (e.g., second wideband waveform 270). That is, IDFT 545 may perform upconversion, subfilters 515 may perform image reject filtering, and commutator 550 may perform upsampling. Polyphase synthesis bank 505 may be an example of an upconverting filter 350.

Figure 6:
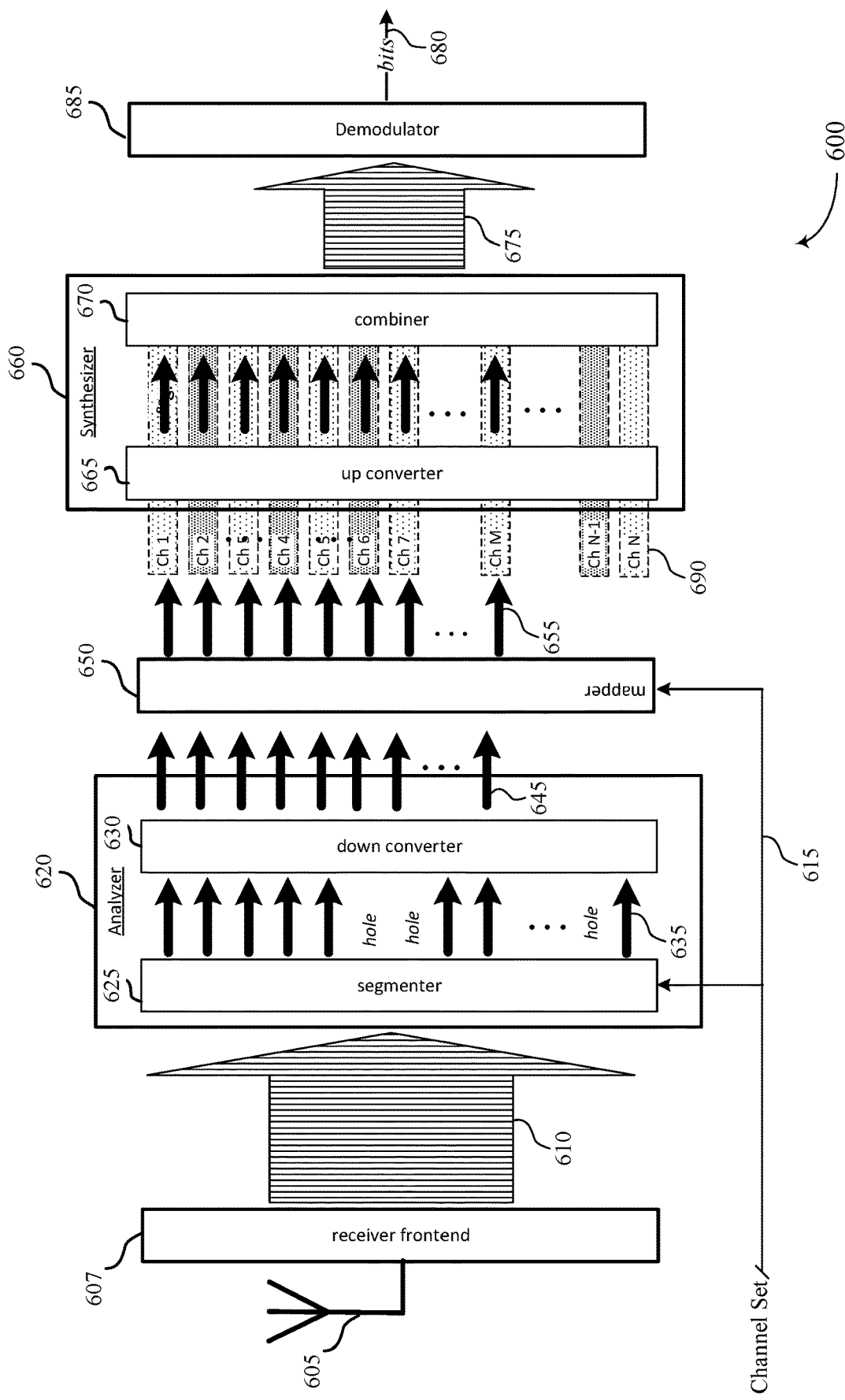
FIG. 6 illustrates an example of a receiver that supports channelizing a wideband waveform for transmission on a spectral band comprising unavailable channel segments in accordance with aspects of the present disclosure.

FIG. 6 illustrates an example of a receiver 600 that supports channelizing a wideband waveform for transmission on a spectral band comprising unavailable channel segments in accordance with aspects of the present disclosure. In some examples, receiver 600 may be included in a wireless communication system, such as wireless communication system 100.

Receiver 600 may be configured to wirelessly receive wideband waveforms over a tactical data link using one or more antennas 605. Receiver 600 may be configured to receive a first wideband waveform 610 via a system bandwidth, which may be a band of frequencies over which receiver 600 may receive signals. In some cases, a system bandwidth may be partitioned into channels, with each channel having a respective bandwidth (e.g., the same channel bandwidth).

In some cases, one or more channels of the system bandwidth of the first wideband waveform 610 may be unused for a received signal (e.g., via a "net" of a tactical data link). Unused channels of the system bandwidth may not include data to be received and/or may have a received level of signal power (e.g., signal energy) that is below a threshold. That is, in some cases, there may be substantial energy of the received signal only in a subset of channels of the channels of the system bandwidth. In some cases, the subset of channels may be non-contiguous; that is, at least two channels in the subset of channels may be separated by one or more channels that are excluded from the subset of channels. In some cases, receiver 600 identifies that a level of signal power for at least one of the channels of the system bandwidth satisfies a threshold (e.g., is below a minimum), and excludes such channel(s) from the subset of channels 615. Receiver 600 may identify or receive an indication of the subset of channels of the system bandwidth associated with a signal for reception (e.g., channel set 615).

In some cases, receiver 600 may include a receiver frontend 607 that includes hardware or software to process a signal received using antenna(s) 605 to generate first wideband waveform 610. For example, receiver frontend 607 may filter the received signal, mix the signal (e.g., downconvert), perform analog-to-digital conversion, and/or perform other processing.

Receiver 600 includes analyzer 620. Analyzer 620 includes segmenter 625 for separating the first wideband waveform 610 into multiple segments 635. Segments 635 may have respective bandwidths corresponding to channel bandwidths of the channels of the system bandwidth (e.g., the same bandwidth). In some cases, segmenter 625 may separate the first wideband waveform 610 into segments 635 by applying multiple filters (such as BPFs) to the first wideband waveform 610. In some cases, segmenter 625 may include a series of filters to separate first wideband waveform 610 into segments 635, and may be implemented using a downconverting filter. For example, analyzer 620 may be structurally similar to analyzer 230-*a*, downconverting filter 330, or polyphase analysis bank 500. In one example, analyzer 620 may be structurally similar to analyzer 230-*a* with M (or more) bandpass filters 332, where M is the number of channels in channel set 615. Alternatively, analyzer 620 may include N (or more) bandpass filters 332, where N is the total number of channels of the system bandwidth.

In some cases, analyzer 620 includes downconverter 630 to downconvert the segments 635 to baseband segments

645. For example, segments 635 may each be associated with different frequency ranges and downconverter 640 may downconvert each segment 635 to a baseband frequency range.

Receiver 600 includes mapper 650 for de-mapping the segments (e.g., baseband segments 645) corresponding to the channel set 615 to the corresponding frequency ranges of synthesizer channels 690. In some cases, the remaining channels (e.g., channels of the system bandwidth that are not included in channel set 615) may be ignored. For example, the system bandwidth may include N channels while channel set 615 may include M channels. Mapper 650 may map M channels of the N channels that are in channel set 615 to a first set of M synthesizer channels 690 while NM channels of synthesizer channels 690 may not be mapped (e.g., may have a null signal mapped). In some cases, de-mapping the segments may include de-scrambling an order of the segments according to a scrambling sequence. The scrambling sequence may include an indication of a scrambled order of the segments. In some cases, the scrambling sequence includes multiple sub-groups of the waveform segments, and the sub-groups are de-mapped from respective contiguous blocks of the subset of the plurality of channels.

In some examples, mapper 650 may perform additional processing. For example, mapper 650 may perform multipath equalization of baseband segments 645 before de-mapping the baseband segments 645.

Receiver 600 includes synthesizer 660 for generating a second wideband waveform 675. Second wideband waveform 675 may have a bandwidth that is narrower than first wideband waveform 610. Synthesizer 660 includes upconverter 665 for upconverting the de-mapped segments 655 to higher frequencies. Synthesizer 660 includes combiner 670 for combining the upconverted de-mapped segments to obtain a second wideband waveform 675 having a bandwidth corresponding to the total (e.g., aggregate) bandwidth of channel set 615. In some examples, synthesizer 660 may be structurally similar to synthesizer 255-*a*, upconverting filter 350, or polyphase synthesis bank 505. In one example, synthesizer 660 may be structurally similar to synthesizer 255-*a* with M (or more) interpolators 352, image rejection filters 354, and upconverters 356, where M is the number of channels in the channel set 615.

In some cases, receiver 600 may include hardware or software to implement additional processing on second wideband waveform 675 to generate a stream of bits 680 representing second wideband waveform 675. For example, receiver 600 may include a demodulator 685 to demodulate second wideband waveform 675 to obtain the stream of bits 680. In some cases, a receiver 600 may identify a modulation scheme (e.g., from a set of modulation schemes) for demodulating the second wideband waveform 675 to obtain stream of bits 680 based on information associated with the signal (e.g., from the transmitter). Receiver 600 may demodulate the second wideband waveform according to the selected modulation scheme.

Receiver 600 may provide the stream of bits 680 to a processor or other device that is coupled with receiver 600.

In one example, a system bandwidth of 45 MHz may be configured with 3 MHz channels (e.g., 15 channels). Receiver 600 may identify a channel set 615 for a first time period (e.g., a first pulse period) that includes channels 1-5, 8-10, 13, and 15 (e.g., including 10 of the 15 channels). Receiver 600 may receive a first wideband waveform 610 (e.g., via antenna(s) 605 and receiver frontend 607). The first wideband waveform 610 may have a bandwidth corresponding to the system bandwidth (e.g., 45 MHz) with substantially no signal energy (e.g., associated with the signal to be received) in channels 6, 7, 11, 12, and 14. Analyzer 620 may segment and downconvert each segment to generate 15 baseband segments 645, each representing a portion (e.g., 3 MHz) of the 45 MHz bandwidth, and each having a baseband frequency range of 0-3 MHz. Mapper 650 may map the baseband segments 645 corresponding to channel set 615 to (e.g., a first 10) synthesizer channels 690, and may map null waveforms to other synthesizer channels 690 (e.g., synthesizer channels 690 other than the first 10). Mapper 650 may map the baseband segments 645 from analyzer 620 in order, or mapper 650 may map the baseband segments 645 in a scrambled order. For example, mapper 650 may map baseband segments 1-5 to synthesizer channels 5-9, baseband segments 8-10 to synthesizer channels 2-4, baseband segment 13 to synthesizer channel 1, and baseband segment 15 to synthesizer channel 10. Synthesizer 660 may upconvert the mapped segments to frequencies corresponding to a width of channels of the system bandwidth and combine the upconverted segments to obtain a second wideband waveform 675. In this example, second wideband waveform 675 may have a bandwidth of 30 MHz.

Receiver 600 may identify a new channel set 615 for a second time period (e.g., a second pulse period), and may perform the segmenting, downconverting, mapping, upconverting, and combining to generate a second wideband waveform 675 for the second time period. New channel set 615 may be different than the channel set 615 for the first pulse period and may or may not have any channels in common with the previous channel set 615. For example, new channel set 615 may have the same or a different number of channels. It should be understood that this example is provided for the sake of clarity, and other system bandwidths and channel bandwidths are contemplated without deviating from the scope of the application. For example, the system bandwidth may be 240 MHz, and the system may have 80 channels where each channel has a 3 MHz channel bandwidth. Channel set 615 may have up to 51 channels in each pulse period and thus first wideband waveform 610 may have a bandwidth of up to 240 MHz while second wideband waveform 675 may have a bandwidth of up to 153 MHz (e.g., the system bandwidth).

Figure 7:
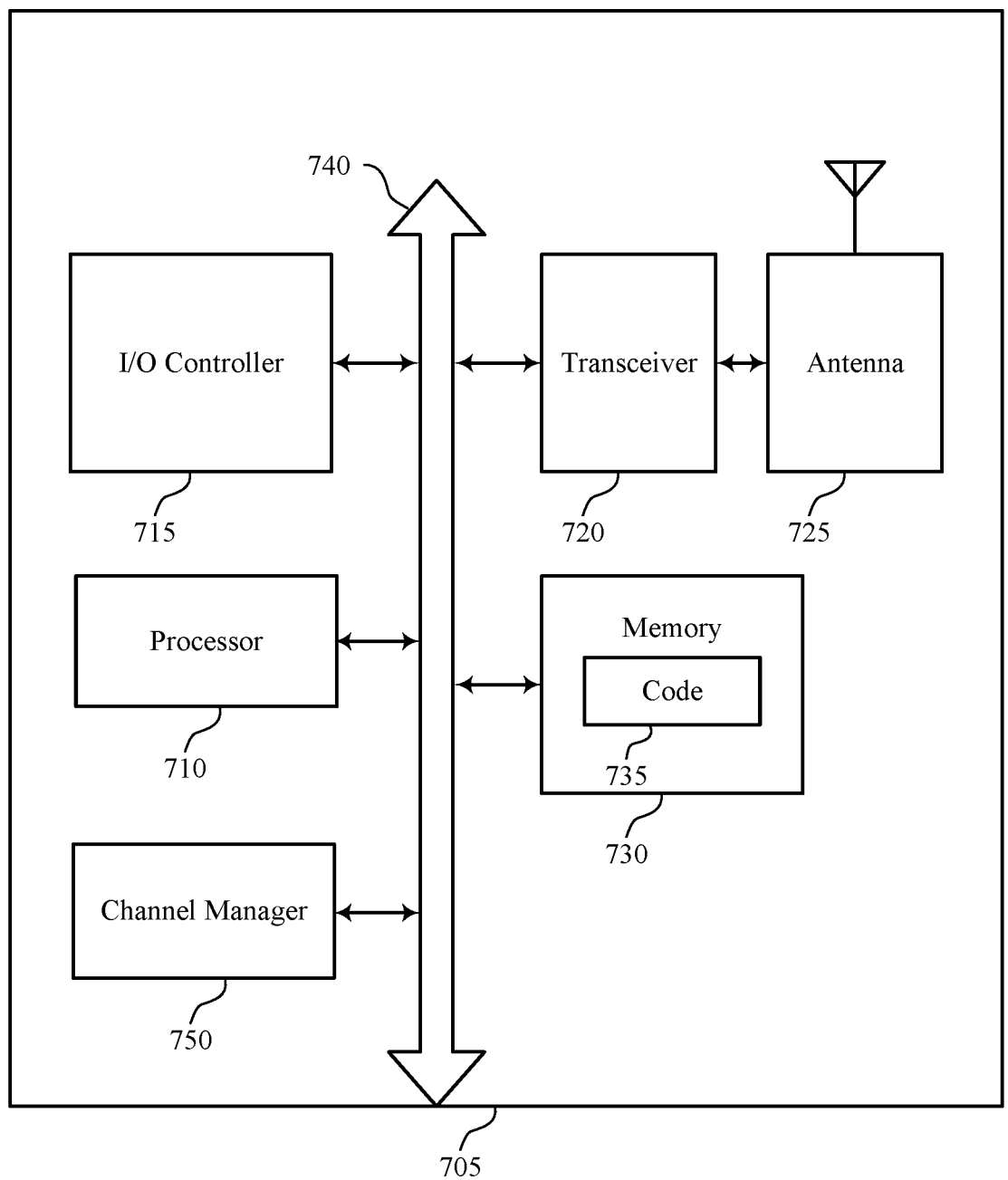
FIG. 7 illustrates an example of a device that supports channelizing a wideband waveform for transmission on a spectral band comprising unavailable channel segments in accordance with aspects of the present disclosure.

FIG. 7 shows a diagram of a system 700 including a device 705 that supports channelizing a wideband waveform for transmission on a spectral band comprising unavailable channel segments in accordance with aspects of the present disclosure. The device 705 may include components for bi-directional communications of wideband waveforms including components for transmitting and receiving communications, including a processor 710, an I/O controller 715, a transceiver 720, an antenna 725, and memory 730. These components may be in electronic communication via one or more buses (e.g., bus 740).

The processor 710 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 710 may be configured to operate a memory array using a memory controller. In other cases, a memory controller may be integrated into the processor 710. The processor 710 may be configured to execute computer-readable instructions stored in a memory (e.g., memory 730) to cause the device 705 to perform various functions (e.g., functions or tasks supporting channelizing a wideband waveform for transmission on a spectral band comprising unavailable channel segments).

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate signals and provide the modulated signals to the antennas for transmission, and to demodulate signals received from the antennas.

In some cases, the wireless device may include a single antenna 725. However, in some cases the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The device 705 may include channel manager 750. Channel manager 750 may identify a subset (e.g., channel set 215 or 615) of channels of a system bandwidth available for a transmission in a time period. Each of the channels may have a respective channel bandwidth (e.g., the same channel bandwidth, or different channel bandwidths). The subset of the channels may be non-contiguous. In some examples, the subset of the channels may correspond to all of a set of available channels (e.g., a configured set of available channels, which may be a subset of the total channels of the system bandwidth). Alternatively, the subset of the channels may be a subset of the available channels (e.g., a configured number of channels). In some cases the subset of channels may be determined by excluding channels from the available channels or configured channels that have a level of signal power (e.g., interference) that satisfies (e.g., meets or exceeds) a threshold.

The code 735 may include instructions to implement aspects of the present disclosure, including instructions to support methods for transmitting and/or receiving channelized wideband waveforms as described herein. For example, the code 735 may include instructions for performing (e.g., by the processor 710 and/or the transceiver 720) the functions of the modulator 210, the analyzer 230 or 620, the mapper 250 or 650, the synthesizer 255 or 660, and/or the demodulator 685. The code 735 may be stored in a non-transitory computer-readable medium such as system memory or other type of memory. In some cases, the code 735 may not be directly executable by the processor 710 but may cause a computer (e.g., when compiled and executed) to perform functions described herein.

Figure 8:
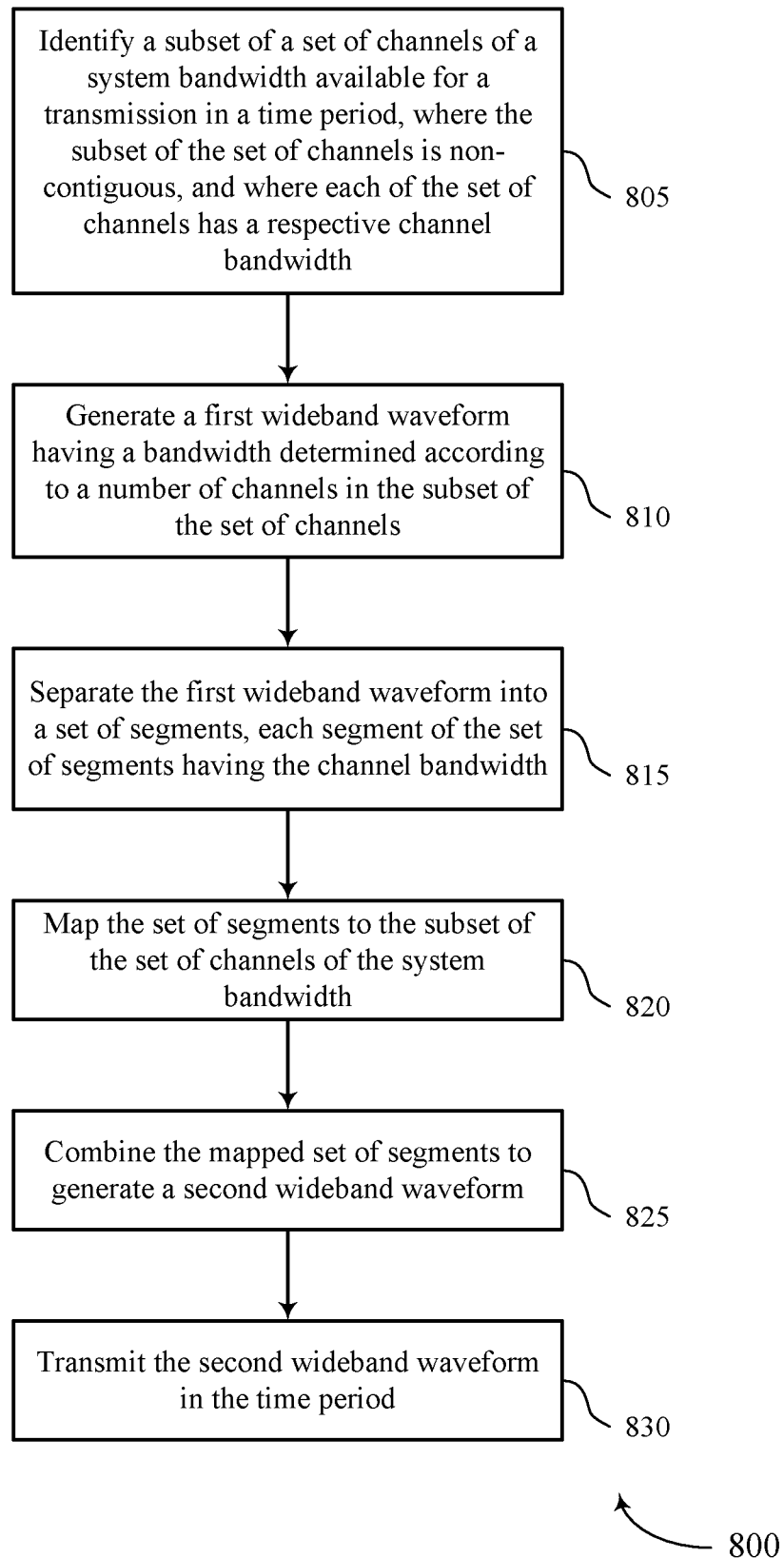
FIGS. 8 and 9 show flowcharts illustrating methods that support channelizing a wideband waveform for transmission on a spectral band comprising unavailable channel segments in accordance with aspects of the present disclosure.

FIG. 8 shows a flowchart illustrating a method 800 that supports channelizing a wideband waveform for transmission on a spectral band comprising unavailable channel segments in accordance with aspects of the present disclosure. The operations of method 800 may be implemented by a transmitter or a device or their components as described herein. For example, the operations of method 800 may be performed by a transmitter as described with reference to FIGS. 2 through 5 and/or a device as described with reference to FIG. 7. In some examples, a processor may execute a set of instructions to control the functional elements of the default to perform the functions described below. Additionally or alternatively, a transmitter may perform aspects of the functions described below using special-purpose hardware, programmable logic, or other means.

At 805, the transmitter may identify a subset of a set of channels of a system bandwidth available for a transmission in a time period (e.g., channel set 215), where the subset of the set of channels is non-contiguous, and where each of the set of channels has a respective channel bandwidth. For example, each of the set of channels may have the same bandwidth, or some channels of the set of channels may have different bandwidths from other channels. The operations of 805 may be performed according to the methods described herein. In some examples, aspects of the operations of 805 may be performed by a transmitter as described with reference to FIGS. 2 through 5.

At 810, the transmitter may generate a first wideband waveform having a bandwidth determined according to a number of channels in the subset of the set of channels. The operations of 810 may be performed according to the methods described herein. In some examples, aspects of the operations of 810 may be performed by a transmitter as described with reference to FIGS. 2 through 5.

At 815, the transmitter may separate the first wideband waveform into a set of segments, each segment of the set of segments having a bandwidth corresponding to the respective bandwidth of the channel of the set of channels. The operations of 815 may be performed according to the methods described herein. In some examples, aspects of the operations of 815 may be performed by a transmitter as described with reference to FIGS. 2 through 5.

At 820, the transmitter may map the set of segments to the subset of the set of channels of the system bandwidth. The operations of 820 may be performed according to the methods described herein. In some examples, aspects of the operations of 820 may be performed by a transmitter as described with reference to FIGS. 2 through 5.

At 825, the transmitter may combine the mapped set of segments to generate a second wideband waveform. The operations of 825 may be performed according to the methods described herein. In some examples, aspects of the operations of 825 may be performed by a transmitter as described with reference to FIGS. 2 through 5.

At 830, the transmitter may transmit the second wideband waveform in the time period. The operations of 830 may be performed according to the methods described herein. In some examples, aspects of the operations of 830 may be performed by a transmitter as described with reference to FIGS. 2 through 5.

Figure 9:
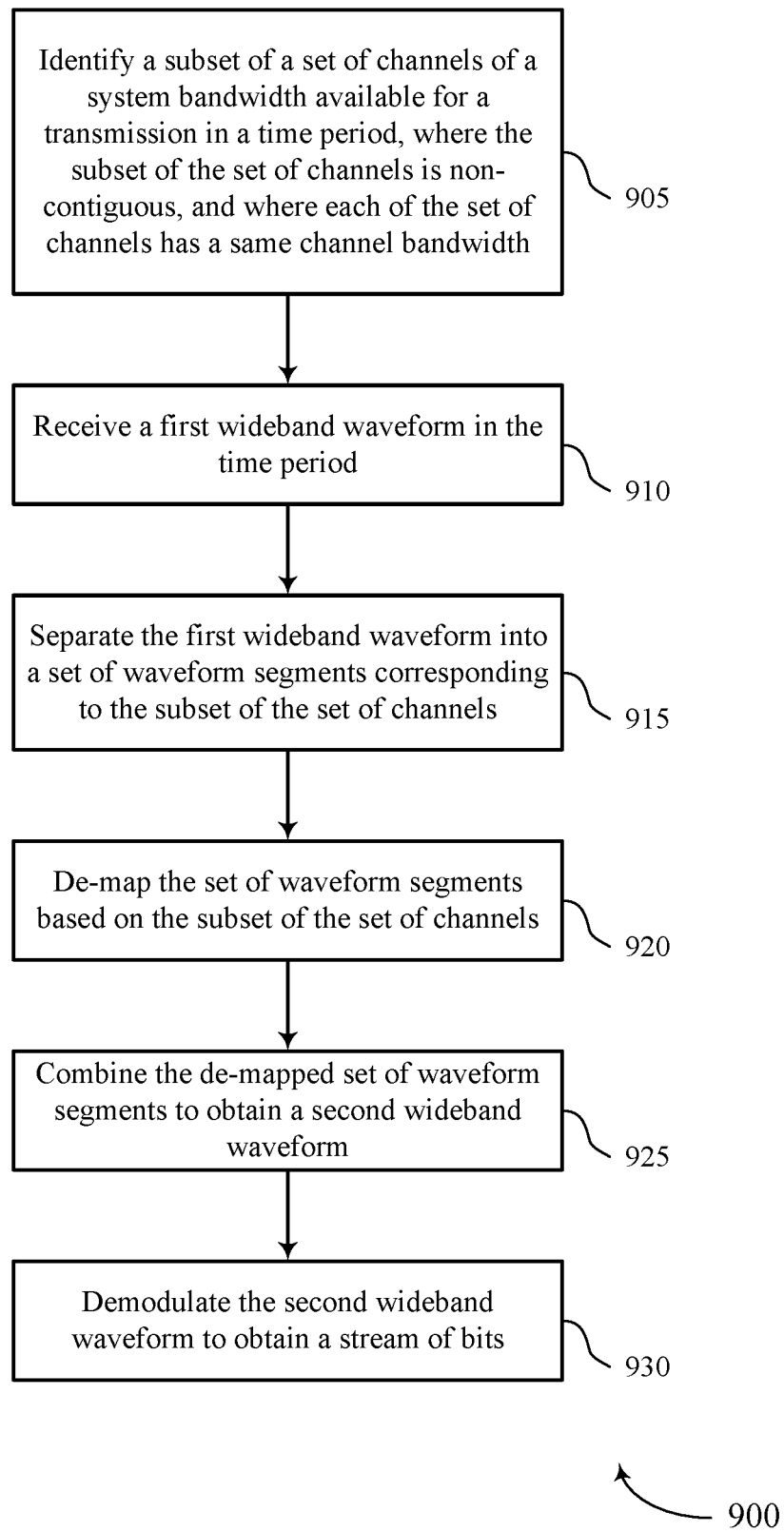

FIG. 9 shows a flowchart illustrating a method 900 that supports channelizing a wideband waveform for transmission on a spectral band comprising unavailable channel segments in accordance with aspects of the present disclosure. The operations of method 900 may be implemented by a receiver or a device or their components as described herein. For example, the operations of method 900 may be performed by a receiver as described with reference to FIG. 6 and/or a device as described with reference to FIG. 7. In some examples, a processor may execute a set of instructions to perform the functions described below. Additionally or alternatively, a receiver may perform aspects of the functions described below using special-purpose hardware or programmable logic.

At 905, a receiver may identify a subset of a set of channels of a system bandwidth available for a transmission in a time period, where the subset of the set of channels is non-contiguous, and where each of the set of channels has a same channel bandwidth. The operations of 905 may be performed according to the methods described herein. In some examples, aspects of the operations of 905 may be performed by a receiver or device as described with reference to FIGS. 6 and 7.

At 910, the receiver may receive a first wideband waveform in the time period. The operations of 910 may be performed according to the methods described herein. In some examples, aspects of the operations of 910 may be performed by a receiver or device as described with reference to FIGS. 6 and 7.

At 915, the receiver may separate the first wideband waveform into a set of waveform segments corresponding to the subset of the set of channels. The operations of 915 may be performed according to the methods described herein. In some examples, aspects of the operations of 915 may be performed by a receiver or device as described with reference to FIGS. 6 and 7.

At 920, the receiver may de-map the set of waveform segments based on the subset of the set of channels. The operations of 920 may be performed according to the methods described herein. In some examples, aspects of the operations of 920 may be performed by a receiver or device as described with reference to FIGS. 6 and 7.

At 925, the receiver may combine the de-mapped set of waveform segments to obtain a second wideband waveform. The operations of 925 may be performed according to the methods described herein. In some examples, aspects of the operations of 925 may be performed by a receiver or device as described with reference to FIGS. 6 and 7.

At 930, the receiver may demodulate the second wideband waveform to obtain a stream of bits. The operations of 930 may be performed according to the methods described herein. In some examples, aspects of the operations of 930 may be performed by a receiver or device as described with reference to FIGS. 6 and 7.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   identifying a subset of a plurality of channels of a system bandwidth available for a transmission in a time period, wherein the subset of the plurality of channels is non-contiguous, and wherein each of the plurality of channels has a respective channel bandwidth;
   generating a first wideband waveform having a bandwidth determined according to a number of channels in the subset of the plurality of channels;
   separating the first wideband waveform into a plurality of segments, each segment of the plurality of segments having a bandwidth corresponding to the respective channel bandwidth of a corresponding one of the subset of the plurality of channels;
   mapping the plurality of segments to the subset of the plurality of channels of the system bandwidth;
   combining the mapped plurality of segments to generate a second wideband waveform; and
   transmitting the second wideband waveform in the time period.

2. The method of claim 1, further comprising:
   downconverting the plurality of segments to a baseband frequency range before mapping the plurality of segments to the subset of the plurality of channels.

3. The method of claim 2, further comprising:
   downsampling, after downconverting the plurality of segments to a baseband frequency and before mapping the plurality of segments to the subset of the plurality of channels, the plurality of segments from a first sampling rate to a second sampling rate that is lower than the first sampling rate.

4. The method of claim 3, further comprising:
   upconverting the mapped plurality of segments from the baseband frequency range to respective frequency ranges associated with the subset of the plurality of channels before combining the mapped plurality of segments to generate the second wideband waveform.

5. The method of claim 4, further comprising:
   upsampling, after mapping the plurality of segments to the subset of the plurality of channels and before upconverting the mapped plurality of segments, the mapped plurality of segments from the second sampling rate to a third sampling rate that is higher than the second sampling rate.

6. The method of claim 1, wherein identifying the subset of the plurality of channels comprises:
   identifying that a level of signal power for at least one of the plurality of channels satisfies a threshold; and
   excluding the at least one of the plurality of channels from the subset of the plurality of channels.

7. The method of claim 1, wherein identifying the subset of the plurality of channels comprises:
   receiving an indication of a provisional subset of the plurality of channels of the system bandwidth available for the transmission in the time period; and
   selecting the subset of the plurality of channels from the provisional subset of the plurality of channels based at least in part on channel conditions of the provisional subset of the plurality of channels, a power constraint, a quantity of data for the transmission in the time period, or a combination thereof.

8. The method of claim 1, wherein mapping the plurality of segments to the subset of the plurality of channels comprises:
   scrambling an order of the plurality of segments among the subset of the plurality of channels.

9. The method of claim 8, wherein scrambling the order of the plurality of segments among the subset of the plurality of channels comprises:
   separating the plurality of segments into a plurality of sub-groups of segments; and
   mapping each of the plurality of sub-groups of segments to respective contiguous blocks of the subset of the plurality of channels.

10. The method of claim 1, wherein mapping the plurality of segments to the subset of the plurality of channels comprises:
    mapping null segments to a second subset of the plurality of channels, the second subset of the plurality of channels being a disjoint subset to the subset of the plurality of channels.

11. The method of claim 1, wherein separating the first wideband waveform into the plurality of segments comprises:
    filtering the first wideband waveform using a corresponding plurality of bandpass filters.

12. The method of claim 11, wherein the corresponding plurality of bandpass filters comprises a plurality of polyphase filters.

13. The method of claim 1, wherein transmitting the second wideband waveform comprises:
    transmitting the second wideband waveform using a tactical data link.

14. The method of claim 1, further comprising:
    receiving a stream of bits for the transmission in the time period; and
    modulating the stream of bits to generate the first wideband waveform.

15. The method of claim 14, wherein modulating the stream of bits comprises:
    selecting a modulation scheme from a set of modulation schemes according to a code rate; and
    modulating the stream of bits according to the selected modulation scheme.

16. The method of claim 1, further comprising:
    identifying a second subset of the plurality of channels available for a second transmission in a second time period, wherein the second subset of the plurality of channels is non-contiguous, and wherein the second subset of the plurality of channels is different from the subset of the plurality of channels;

generating a third wideband waveform having a bandwidth determined according to a number of channels in the second subset of the plurality of channels;

separating the third wideband waveform into a second plurality of segments, each segment of the second plurality of segments having the channel bandwidth;

mapping the second plurality of segments to the second subset of the plurality of channels of the system bandwidth;

combining the mapped second plurality of segments to generate a fourth wideband waveform; and transmitting the fourth wideband waveform in the second time period.

17. The method of claim 16, wherein the second subset of the plurality of channels includes at least one channel in common with the subset of the plurality of channels.

18. The method of claim 16, wherein the second subset of the plurality of channels includes a different number of channels from the subset of the plurality of channels.

19. The method of claim 1, wherein each of the respective channel bandwidths of the plurality of channels has a same bandwidth.

20. A method, comprising:
identifying a subset of a plurality of channels of a system bandwidth available for a transmission in a time period, wherein the subset of the plurality of channels is non-contiguous, and wherein each of the plurality of channels has a respective channel bandwidth;

receiving a first wideband waveform in the time period;

separating the first wideband waveform into a plurality of waveform segments corresponding to the subset of the plurality of channels;

de-mapping the plurality of waveform segments based at least in part on the subset of the plurality of channels;

combining the de-mapped plurality of waveform segments to obtain a second wideband waveform; and demodulating the second wideband waveform to obtain a stream of bits.

21. The method of claim 20, further comprising:
downconverting the plurality of waveform segments to a baseband frequency range before de-mapping the plurality of waveform segments based at least in part on the subset of the plurality of channels.

22. The method of claim 20, further comprising:
upconverting the de-mapped plurality of waveform segments before combining the de-mapped plurality of waveform segments to generate the second wideband waveform.

23. The method of claim 20, wherein separating the first wideband waveform into the plurality of waveform segments comprises:
filtering the first wideband waveform using a corresponding plurality of bandpass filters.

24. The method of claim 20, wherein receiving the first wideband waveform comprises:
receiving the first wideband waveform via a tactical data link.

25. The method of claim 20, wherein each of the respective channel bandwidths of the plurality of channels has a same bandwidth.

26. An apparatus, comprising:
a channel manager configured to identify a subset of a plurality of channels of a system bandwidth available for a transmission in a time period, wherein the subset of the plurality of channels is non-contiguous, and wherein each of the plurality of channels has a respective channel bandwidth;

a modulator configured to generate a first wideband waveform having a bandwidth determined according to a number of channels in the subset of the plurality of channels, an analyzer coupled with the modulator and configured to separate the first wideband waveform into a plurality of segments having bandwidths corresponding to the respective channel bandwidths of corresponding channels of the subset of the plurality of channels;

a mapper coupled with the analyzer and configured to map the plurality of segments to the subset of the plurality of channels of the system bandwidth;

a synthesizer coupled with the mapper and configured to combine the mapped plurality of segments to generate a second wideband waveform; and a transmitter backend coupled with the synthesizer and configured to transmit the second wideband waveform in the time period.

27. The apparatus of claim 26, wherein the analyzer comprises:
a downconverting filter configured to separate the first wideband waveform into the plurality of segments and downconvert the plurality of segments to a baseband frequency range.

28. The apparatus of claim 27, wherein the downconverting filter comprises a polyphase filter and an inverse discrete Fourier transform component.

29. The apparatus of claim 27, wherein the analyzer comprises:
a decimator coupled with the downconverting filter and configured to downsample the downconverted plurality of segments from a first sampling rate to a second sampling rate that is lower than the first sampling rate.

30. The apparatus of claim 26, wherein the synthesizer comprises:
an upconverting filter configured to upconvert the mapped plurality of segments from the baseband frequency range to respective frequency ranges associated with the subset of the plurality of channels.

31. The apparatus of claim 30, wherein the synthesizer comprises:
an interpolator coupled with the upconverting filter and configured to upsample the mapped plurality of segments output from the upconverting filter from the second sampling rate to a third sampling rate that is higher than the second sampling rate.

32. The apparatus of claim 30, wherein the upconverting filter comprises a polyphase filter and an inverse discrete Fourier transform component.

33. The apparatus of claim 26, wherein the channel manager is further configured to:
identify that a level of signal power for at least one of the plurality of channels satisfies a threshold; and
exclude the at least one of the plurality of channels from the subset of the plurality of channels.

34. The apparatus of claim 26, wherein the channel manager is further configured to:
receive an indication of a provisional subset of the plurality of channels of the system bandwidth available for the transmission in the time period; and
select the subset of the plurality of channels from the provisional subset of the plurality of channels based at least in part on channel conditions of the provisional subset of the plurality of channels, a power constraint, a quantity of data for the transmission in the time period, or a combination thereof.

35. The apparatus of claim 26, wherein the mapper is further configured to:
scramble an order of the plurality of segments among the subset of the plurality of channels.

36. The apparatus of claim 35, wherein, to scramble the order of the plurality of segments among the subset of the plurality of channels, the mapper is further configured to:
separate the plurality of segments into a plurality of sub-groups of segments; and
map each of the plurality of sub-groups of segments to respective contiguous blocks of the subset of the plurality of channels.

37. The apparatus of claim 26, wherein the mapper is further configured to:
map null segments to a second subset of the plurality of channels, the second subset of the plurality of channels being a disjoint subset to the subset of the plurality of channels.

38. The apparatus of claim 26, wherein the modulator is further configured to:
receive a stream of bits for the transmission in the time period; and
modulate the stream of bits to generate the first wideband waveform.

39. The apparatus of claim 38, wherein the modulator is further configured to:
select a modulation scheme from a set of modulation schemes according to a code rate; and
modulate the stream of bits according to the selected modulation scheme.

40. The apparatus of claim 26, wherein:
the channel manager is further configured to identify a second subset of the plurality of channels available for a second transmission in a second time period, wherein the second subset of the plurality of channels is non-contiguous, and wherein the second subset of the plurality of channels is different from the subset of the plurality of channels;
the modulator is further configured to generate a third wideband waveform having a bandwidth determined according to a number of channels in the second subset of the plurality of channels;
the analyzer is further configured to separate the third wideband waveform into a second plurality of segments, each segment of the second plurality of segments having the channel bandwidth;
the mapper is further configured to map the second plurality of segments to the second subset of the plurality of channels of the system bandwidth;
the synthesizer is further configured to combine the mapped second plurality of segments to generate a fourth wideband waveform; and
the transmitter is further configured to transmit the fourth wideband waveform in the second time period.

41. The apparatus of claim 40, wherein the second subset of the plurality of channels includes at least one channel in common with the subset of the plurality of channels.

42. The apparatus of claim 40, wherein the second subset of the plurality of channels includes a different number of channels from the subset of the plurality of channels.

43. The apparatus of claim 26, wherein each of the respective channel bandwidths of the plurality of channels has a same bandwidth.

44. An apparatus, comprising:
bandwidth available for a transmission in a time period, wherein the subset of the plurality of channels is non-contiguous, and wherein each of the plurality of channels has a respective channel bandwidth;
a receiver frontend configured to receive a first wideband waveform in the time period;
an analyzer coupled with the receiver and configured to separate the first wideband waveform into a plurality of waveform segments corresponding to the subset of the plurality of channels;
a mapper coupled with the analyzer and configured to de-map the plurality of waveform segments based at least in part on the subset of the plurality of channels;
a synthesizer coupled with the mapper and configured to combine the de-mapped plurality of waveform segments to obtain a second wideband waveform; and
a demodulator coupled with the synthesizer and configured to demodulate the second wideband waveform to obtain a stream of bits.

45. The apparatus of claim 44, further comprising:
a downconverting filter configured to separate the first wideband waveform into the plurality of waveform segments and downconvert the plurality of waveform segments to a baseband frequency range.

46. The apparatus of claim 45, wherein the analyzer comprises:
a decimator coupled with the downconverting filter and configured to downsample the downconverted plurality of waveform segments from a first sampling rate to a second sampling rate that is lower than the first sampling rate.

47. The apparatus of claim 44, wherein the synthesizer comprises:
an upconverting filter configured to upconvert the mapped plurality of waveform segments from the baseband frequency range to respective frequency ranges associated with a bandwidth of the second wideband waveform.

48. The apparatus of claim 47, wherein the synthesizer comprises:
an interpolator coupled with the upconverting filter and configured to upsample the mapped plurality of segments output from the upconverting filter from the second sampling rate to a third sampling rate that is higher than the second sampling rate.

49. The apparatus of claim 44, wherein each of the respective channel bandwidths of the plurality of channels has a same bandwidth.

\* \* \* \* \*